(12) United States Patent
Mehrholz et al.

(10) Patent No.: US 12,424,071 B2
(45) Date of Patent: Sep. 23, 2025

(54) FIRE DETECTION, LOCALIZATION AND MONITORING SYSTEM AND METHOD FOR A VEHICLE COMPARTMENT

(71) Applicant: Airbus Operations GmbH, Hamburg (DE)

(72) Inventors: Holger Mehrholz, Hamburg (DE); Lennard Bischof, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 252 days.

(21) Appl. No.: 18/303,825

(22) Filed: Apr. 20, 2023

(65) Prior Publication Data
US 2023/0343198 A1    Oct. 26, 2023

(30) Foreign Application Priority Data
Apr. 25, 2022    (EP) ..................................... 22169792

(51) Int. Cl.
*G08B 17/12*    (2006.01)
(52) U.S. Cl.
CPC .................................. *G08B 17/125* (2013.01)
(58) Field of Classification Search
CPC ........ G08B 17/125; G08B 5/36; G08B 17/12; B64D 45/00; B64D 43/00; B64D 47/08; B64D 2045/009; H04N 23/23; H04N 7/181; A62C 3/08; G01J 5/0018; G01J 5/0066
See application file for complete search history.

(56) References Cited

U.S. PATENT DOCUMENTS

| | | | | |
|---|---|---|---|---|
| 2002/0030608 A1* | 3/2002 | Boucourt | ............. | G08B 17/125 340/963 |
| 2002/0135490 A1* | 9/2002 | Opitz | .................. | G08B 17/125 340/628 |
| 2003/0020808 A1* | 1/2003 | Luke | ........................ | G06T 7/20 348/47 |
| 2003/0215141 A1 | 11/2003 | Zakrzewski et al. | | |

OTHER PUBLICATIONS

European Search Report for European Patent Application No. 22169792 dated Oct. 19, 2022; priority document.
W. Krull, et al., "Design and Test Methods for a Video-Based Cargo Fire Verification System for Commercial Aircraft" Fire Safety Journal 41, pp. 290-300; 2006.

* cited by examiner

*Primary Examiner* — Sisay Yacob
(74) *Attorney, Agent, or Firm* — Greer, Burns & Crain, Ltd.

(57) ABSTRACT

A fire detection, localization and monitoring system for a vehicle compartment, in particular of an aircraft, includes a thermal imaging camera configured to provide thermal monitoring data on heat sources within a monitored area of the vehicle compartment; an optical camera configured to provide visual monitoring data of the monitored area; and a system control configured to analyze the thermal monitoring data and to determine temperature hot spots indicating a potential fire within the monitored area based on the analyzed thermal monitoring data. The system control is further configured to provide a visual indication of determined temperature hot spots within the visual monitoring data.

17 Claims, 1 Drawing Sheet

FIRE DETECTION, LOCALIZATION AND MONITORING SYSTEM AND METHOD FOR A VEHICLE COMPARTMENT

CROSS-REFERENCES TO RELATED APPLICATIONS

This application claims the benefit of the European patent application No. 22169792.3 filed on Apr. 25, 2022, the entire disclosures of which are incorporated herein by way of reference.

FIELD OF THE INVENTION

The present invention pertains to a fire detection, localization and monitoring system and method for a vehicle compartment, in particular of an aircraft.

BACKGROUND OF THE INVENTION

Aircraft systems for the detection of fire in pressurized compartments of a fuselage typically rely on smoke detectors, which are usually based on optical light scattering technologies. More recent smoke detectors implement smart sensors employing multi-wavelength detection, temperature evaluation and/or humidity assessment.

However, if the fire source is somehow hidden within the compartment, e.g., behind a lining/ceiling panel, a monument wall or the like, and/or if the fire is still at a very early stage and thus not well detectable, such conventional systems may not be as effective. Thermal imaging cameras could provide an interesting alternative or addition in this regard, as such hidden fires may be detectable by their heat signature. However, thermal images can be difficult to interpret. Moreover, the spatial relationship between a thermal image and the three-dimensional environment of the compartment may be unclear.

SUMMARY OF THE INVENTION

Against this background, it is an object of the present invention to find fast and precise solutions for locating fires in a vehicle compartment independent of smoke development. According to the invention, a fire detection, localization and monitoring system for a vehicle compartment, in particular of an aircraft, comprises a thermal imaging camera configured to provide thermal monitoring data on heat sources within a monitored area of the vehicle compartment; an optical camera configured to provide visual monitoring data of the monitored area; and a system control configured to analyze the thermal monitoring data and to determine temperature hot spots indicating a potential fire within the monitored area based on the analyzed thermal monitoring data, wherein the system control is further configured to provide a visual indication of determined temperature hot spots within the visual monitoring data.

Further according to the invention, an aircraft comprises a fire detection, localization and monitoring system according to the invention.

Further according to the invention, a method for fire detection, localization and monitoring in a vehicle compartment, in particular of an aircraft, comprises providing thermal monitoring data on heat sources within a monitored area of the vehicle compartment with a thermal imaging camera; providing visual monitoring data of the monitored area with an optical camera; analyzing the thermal monitoring data and determining temperature hot spots indicating a potential fire within the monitored area based on the analyzed thermal monitoring data with a system control; and providing a visual indication of determined temperature hot spots within the visual monitoring data with the system control.

Thus, one idea of the present invention is to use the information provided by a thermal imaging camera, in particular infrared imaging data, to detect the source of a hidden fire that may not be immediately detectable in case of more conventional approaches based on smoke detection. As it is known to be difficult to visually extract spatial references from a thermal image and thus to determine based on a thermal image where a dedicated area can be found exactly in the real environment, the present invention accompanies the thermal imaging camera with an optical camera. Any hot spot detected within the thermal images can now be indicated by the system control by means of a corresponding visual indication on the respective images of the optical camera and can thus be localized and monitored within the compartment. To this end, the optical camera monitors substantially the same area as the thermal imaging camera. The visual indication itself may be, for example, a rectangle, circle or other geometric object that is overlayed on the visual images at the corresponding spatial position of the detected hot spot. However, in principle, any other form of highlighting a spatial origin of a fire within a visual image may be used for this purpose. With the help of the present invention, it is possible to locate the source of a fire more quickly and more precisely, even under stress. Thus, remedial actions may be initiated faster and more effectively.

In some embodiments of the inventions, one or both of the cameras may be permanently installed within the respective vehicle compartment. However, it is to be understood that one or both cameras, as well as the further components of the invention, may also be realized as one or several portable devices.

According to an embodiment of the invention, the thermal imaging camera and the optical camera may be configured to provide their respective monitoring data as live video images of the monitored area. The system control may then be configured to lay the visual indication over the live video images of the optical camera.

Hence, unusual temperature hot spots and potential hidden fires may be spotted in real time, e.g., in a cabin compartment of an aircraft. To this end, the cameras may be positioned at a suitable position anywhere in the compartment where they can monitor at least a certain area of the compartment. It is to be understood that several pairs of cameras may be used to monitor one or several compartments in order to achieve a substantially complete coverage of the respective portions of a vehicle.

According to an embodiment of the invention, the system control may be communicatively coupled to or integrated in a display configured to display at least the live video images of the optical camera including the overlayed visual indication.

Such a display may be installed, for example, outside of the respective compartment, e.g., in a control room of the vehicle. For example, a passenger aircraft may comprise one or several displays within the cockpit continuously monitoring the passenger compartment of the aircraft from one or several viewing directions/angles. In this case, the crew can instantly perceive any occurrence of a (potential) hidden fire and/or or can crosscheck fire alarms raised by a conventional smoke detector or other fire detection device.

According to an embodiment of the invention, the display may be integrated in a mobile device.

The mobile device may be, for example, a tablet or other portable computer that is carried by the crew of the respective vehicle, by which means the crew can verify potential fires swiftly at any point in time no matter where they are currently positioned within the vehicle. To this end, it is also possible to integrate one or both cameras within the respective mobile device. In this case, the crew can thus move around the compartment and point the device at the respective area of the compartment to be checked for a potentially arising fire.

According to an embodiment of the invention, the system control may be configured to analyze the thermal monitoring data based on AI and/or machine learning algorithms to detect and localize the temperature hot spots in the thermal monitoring data.

Such modern data analysis algorithms may localize the exact position of the hidden fire by analyzing the respective thermal (video) images and/or thermal data. The processing of these algorithms may then cause the rendering of a label, indicator and/or other visual indication within the visual (video) images of the respective optical camera. The visual (video) images may then be displayed together with the visual indication on a display/monitor in real time.

According to an embodiment of the invention, the system control may be configured to analyze thermal data of individual pixels within live video images of the thermal imaging camera.

The person of skill will readily conceive suitable analysis algorithms to extract temperature hot spots from the thermal imaging data. For example, one or several temperature thresholds may be used in order to define a temperature hot spot and corresponding alarming temperature characteristics. Such thresholds may be defined for individual pixels or groups of pixels.

According to an embodiment of the invention, the system control may be configured to evaluate a criticality of each determined hot spot based on vehicle configuration data characterizing sensitive vehicle systems and/or sensitive cargo within the monitored area.

For example, critical vehicle systems, electric systems and/or wiring or the like installed at or close to the temperature hot spot and thus the potential fire could be taken into account in this embodiment. The system control may then be able to assess how critical the temperature development is at the respective position and whether certain systems and/or components may need to be switched off and/or shut down to facilitate adequate remedial procedures. In a similar vein, sensible cargo present at or near the respective temperature hot spot may be considered for the further procedure.

To this end, the system control may also be configured to employ AI and/or machine learning algorithms that take into account the further vehicle configuration data.

According to an embodiment of the invention, the system control may be configured to transmit information about the determined temperature hot spots to a remote entity.

For example, data such a position and affected systems/cargo could be transmitted remotely to a control station, a ground station or the like. In that vein, firefighting measures could be immediately started as soon as an affected aircraft is back down on the ground.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. In the figures, like reference numerals denote like or functionally like components, unless indicated otherwise.

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

DETAILED DESCRIPTION OF THE PREFERRED EMBODIMENTS

Figure 1:
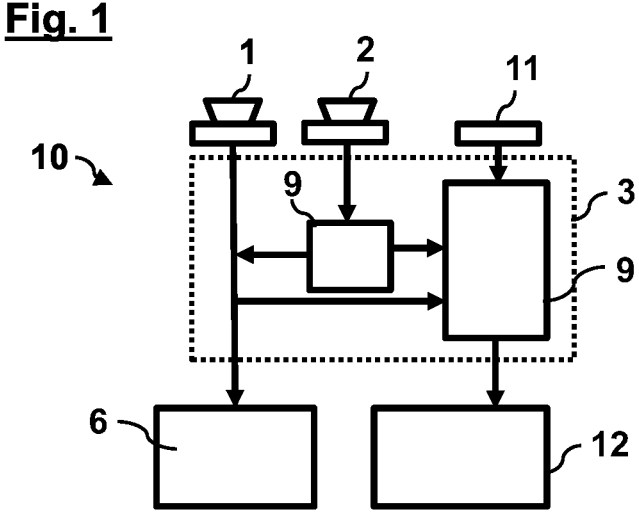
FIG. 1 shows a schematic view of a fire detection, localization and monitoring system according to an embodiment of the invention.
Figure 2:
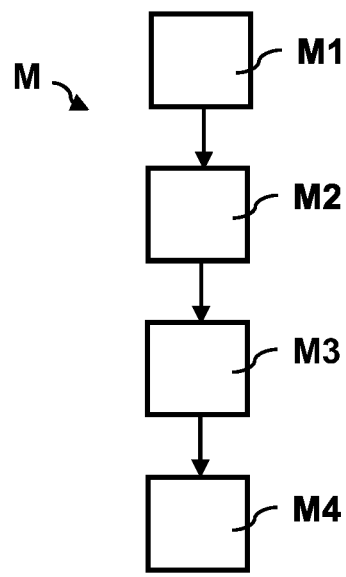
FIG. 2 schematically depicts a flow diagram of a fire detection, localization and monitoring method using the system of FIG. 1.

FIG. 1 shows a schematic view of a fire detection, localization and monitoring system 10 according to an embodiment of the invention. FIG. 2 depicts the steps of a corresponding method M.

Figure 5:
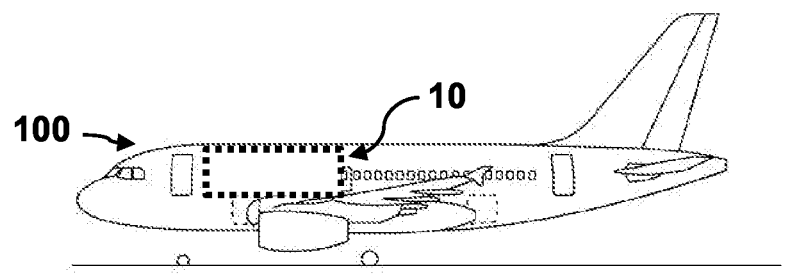
FIG. 5 is a passenger aircraft equipped with the system of FIG. 1.

The fire detection, localization and monitoring system 10 is provided to monitor a vehicle compartment, e.g., a passenger cabin of a passenger aircraft 100 as exemplarily depicted in FIG. 5, in order to determine potential fires that may (still) be hidden for normal smoke detectors and other conventional fire detection means.

To this end, the present system 10 provides two cameras 1, 2: a thermal imaging camera 1 configured to provide thermal monitoring data 1a on heat sources within a monitored area 5 of the vehicle compartment and an optical camera 2 configured to provide visual monitoring data 2a of the monitored area 5. Both cameras 1, 2 are configured to provide their respective monitoring data 1a, 2a as live video images of the monitored area 5. The thermal imaging camera 1 is provided to detect sources of hidden fires within the monitored area. The optical camera 2 on the other hand is provided to visualize the actual position of the hidden fire within the compartment in a vein that can be comprehended by the crew.

To accomplish this, the system 10 further comprises a system control 3 configured to analyze the thermal monitoring data 1a and to determine temperature hot spots 4 indicating a potential fire within the monitored area 5 based on the analyzed thermal monitoring data 1a. The system control 3 is then configured to provide a visual indication 6 of determined temperature hot spots 4 within the visual monitoring data 2a.

Figure 3:
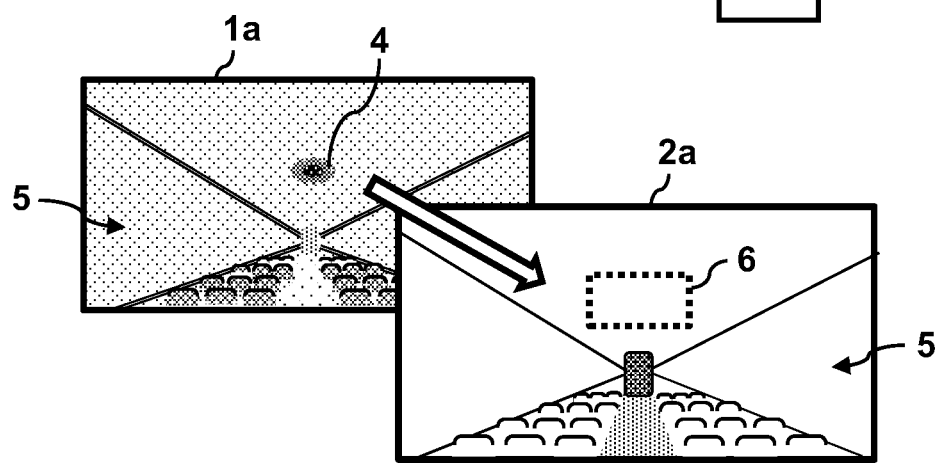
FIG. 3 is a schematic depiction of thermal and visual monitoring data employed by the system and method of FIGS. 1 and 2.

An example for this is shown in FIG. 3. Here, a temperature hot spot 4 is detected within the video feed of the thermal monitoring data 1a, e.g., at the ceiling of a passenger cabin (left of FIG. 3). The system control 3 now highlights the corresponding position in the compartment as a visual indication 6 within the video feed of the visual monitoring data 2a, e.g., as a highlighted and/or colored and/or blinking rectangle around the actual position of the temperature hotspot 4 within the visual image (right side of FIG. 3).

The method M of FIG. 2 thus correspondingly comprises under M1 providing thermal monitoring data 1a on heat sources within a monitored area 5 of the vehicle compartment with the thermal imaging camera 1. The method M further comprises under M2 providing visual monitoring data 2a of the monitored area 5 with the optical camera 2. The method M further comprises under M3 analyzing the thermal monitoring data 1a and determining temperature hot spots 4 indicating a potential fire within the monitored area 5 based on the analyzed thermal monitoring 1a data with the system control 3. The method M finally comprises under M4 providing a visual indication 6 of determined temperature hot spots 4 within the visual monitoring data 2a with the system control 3.

The system control 3 may be configured to analyze the thermal monitoring data 1a based on AI and/or machine learning algorithms 9 to detect and localize the temperature hot spots 4 in the thermal monitoring data 1a. This can be done, for example, by running such advanced algorithms on the thermal video images themselves and/or the thermal data of the individual pixels of each such image.

The system control 3 may further be configured to evaluate a criticality of each determined hot spot 4 based on vehicle configuration data 11 characterizing sensitive vehicle systems and/or sensitive cargo within the monitored area. Also in this case the system control 3 may rely on AI and/or machine learning tools in order to extract and evaluate any relevant information (cf. FIG. 1).

The analysis results may not only be used to provide the visual indication 6 within the visual monitoring data 2a. In addition, the system control 3 may transmit information about the determined temperature hot spots 4 and/or the assessed criticality as well as the affected vehicle systems and/or cargo to a remote entity 12, e.g., a ground station (cf. FIG. 1). In this case, any necessary remedial procedures may be swiftly and effectively prepared on board of the aircraft as well as on the ground.

The cameras 1, 2 may be installed within the vehicle compartment for the present purpose in a suitable position with a good field of view on any relevant portions of the compartment. The system control 2 may then be communicatively coupled to and/or integrated in a display 7 to display at least the live video images of the optical camera 2 including the overlayed visual indication 6.

Figure 4:
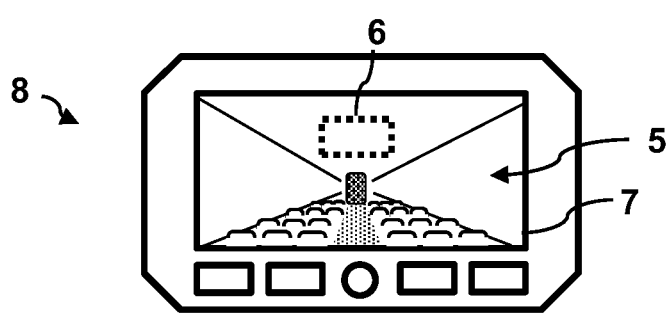
FIG. 4 is a front view of a mobile device implementing the system and method of FIGS. 1 and 2.

Such a display 7 may, for example, be installed within a cockpit of the aircraft 100. Alternatively, or additionally, the display 7 may also be integrated in a mobile device 8, e.g., a tablet or another handheld crew device. An example for such a device 8 is shown in FIG. 4.

In case of such a mobile device 8, also one or both of the cameras 1, 2 may, in principle, be integrated in the device 8. In this case, a member of the crew may walk around the compartment and point the respective device 8 at various portions of the compartment in order to check for potential hidden fires and receive feedback on any detected hot spot.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. The embodiments were chosen and described in order to best explain the principles of the invention and its practical applications, to thereby enable others skilled in the art to best utilize the invention and various embodiments with various modifications as are suited to the particular use contemplated.

The systems and devices described herein may include a controller, control unit, system control 3 or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems for detecting skew in a wing slat of an aircraft described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 thermal imaging camera
1a thermal monitoring data
2 optical camera
2a visual monitoring data
3 system control
4 temperature hot spot
5 monitored area
6 visual indication
7 display
8 mobile device
9 AI and/or machine learning algorithm
10 fire detection, localization and monitoring system
11 vehicle configuration data
12 remote entity
100 aircraft
M method
M1-M4 method steps

The invention claimed is:

1. A fire detection, localization and monitoring system for a vehicle compartment comprising:
a thermal imaging camera configured to provide thermal monitoring data on heat sources within a monitored area of the vehicle compartment;
an optical camera configured to provide visual monitoring data of the monitored area; and
a system control configured to:
analyze the thermal monitoring data and to determine temperature hot spots indicating a potential fire within the monitored area based on the analyzed thermal monitoring data;
determine a criticality of each determined temperature hot spot based on vehicle configuration data;
evaluate the criticality of each determined temperature hot spot to determine an appropriate response; and
provide a visual indication of the determined temperature hot spots within the visual monitoring data.

2. The fire detection, localization and monitoring system according to claim 1,
wherein the thermal imaging camera and the optical camera are configured to provide their respective monitoring data as live video images of the monitored area, and
wherein the system control is configured to lay the visual indication over the live video images of the optical camera.

3. The fire detection, localization and monitoring system according to claim 2, wherein the system control is communicatively coupled to or integrated in a display configured to display at least the live video images of the optical camera including the overlayed visual indication.

4. The fire detection, localization and monitoring system according to claim 3, wherein the display is integrated in a mobile device.

5. The fire detection, localization and monitoring system according to claim 1, wherein the system control is configured to analyze the thermal monitoring data based on at least one of artificial intelligence (AI) or machine learning algorithms to detect and localize the temperature hot spots in the thermal monitoring data.

6. The fire detection, localization and monitoring system according to claim 1, wherein the system control is configured to analyze thermal data of individual pixels within live video images of the thermal imaging camera.

7. The fire detection, localization and monitoring system according to claim 1, wherein the vehicle configuration data includes a characterization of at least one of sensitive vehicle systems and sensitive cargo within the monitored area.

8. The fire detection, localization and monitoring system according to claim 1, wherein the system control is configured to transmit information about the determined temperature hot spots to a remote entity.

9. The fire detection, localization and monitoring system according to claim 1, wherein the vehicle compartment comprises a compartment in an aircraft.

10. An aircraft having a fire detection, localization and monitoring system according to claim 1.

11. A method for fire detection, localization and monitoring in a vehicle compartment, comprising:
providing thermal monitoring data on heat sources within a monitored area of the vehicle compartment with a thermal imaging camera;
providing visual monitoring data of the monitored area with an optical camera;
analyzing the thermal monitoring data and determining temperature hot spots indicating a potential fire within the monitored area based on the analyzed thermal monitoring data with a system control;
determining a criticality of each determined temperature hot spot based on vehicle configuration data with the control system;
evaluating the criticality of each determined temperature hot spot to determine an appropriate response with the control system; and
providing a visual indication of the determined temperature hot spots within the visual monitoring data with the system control.

12. The method according to claim 11,
wherein the respective monitoring data are provided as live video images of the monitored area,
wherein the visual indication is laid over the live video images of the optical camera, and
wherein at least the live video images of the optical camera including the overlayed visual indication are displayed on a display.

13. The method according to claim 11, wherein the thermal monitoring data are analyzed by the system control based on at least one of artificial intelligence (AI) or machine learning algorithms to detect and localize the temperature hot spots in the thermal monitoring data.

14. The method according to claim 11, wherein thermal data of individual pixels within live video images of the thermal imaging camera are analyzed by the system control.

15. The method according to claim 11, wherein the vehicle configuration data includes a characterization of at least one of sensitive vehicle systems and sensitive cargo within the monitored area.

16. The method according to claim 11, wherein information about the determined temperature hot spots are transmitted by the system control to a remote entity.

17. The method according to claim 11, wherein the vehicle compartment is a compartment of an aircraft.

* * * * *